(12) United States Patent
Kuo et al.

(10) Patent No.: US 12,141,006 B2
(45) Date of Patent: Nov. 12, 2024

(54) ELECTRONIC DEVICE AND POWER MANAGEMENT METHOD THEREFOR

(71) Applicant: ASUSTEK COMPUTER INC., Taipei (TW)

(72) Inventors: Chih-Yao Kuo, Taipei (TW); Ya-Han Chang, Taipei (TW); Huang-Chieh Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 105 days.

(21) Appl. No.: 17/828,577

(22) Filed: May 31, 2022

(65) Prior Publication Data

US 2023/0075103 A1    Mar. 9, 2023

(30) Foreign Application Priority Data

Sep. 9, 2021    (TW) .................................. 110133561

(51) Int. Cl.
  *G06F 1/28*    (2006.01)
  *G06F 9/50*    (2006.01)
(52) U.S. Cl.
  CPC .............. *G06F 1/28* (2013.01); *G06F 9/5094* (2013.01)
(58) Field of Classification Search
  CPC ........... G06F 1/28; G06F 9/5094; G06F 1/324
  See application file for complete search history.

(56) References Cited

U.S. PATENT DOCUMENTS

| | | | |
|---|---|---|---|
| 9,348,393 B1* | 5/2016 | Jane | G06F 1/32 |
| 10,706,497 B1* | 7/2020 | Yang | G06F 1/3206 |
| 10,863,213 B2* | 12/2020 | Peng | G09G 5/12 |
| 2008/0082844 A1* | 4/2008 | Ghiasi | G06F 1/3203 713/323 |
| 2010/0162256 A1* | 6/2010 | Branover | G06F 1/3203 718/104 |
| 2012/0324250 A1* | 12/2012 | Chakraborty | G06F 1/329 713/300 |
| 2014/0075223 A1* | 3/2014 | Tan | G06F 1/3243 713/322 |

(Continued)

FOREIGN PATENT DOCUMENTS

| | | |
|---|---|---|
| CN | 107896386 A | 4/2018 |
| CN | 106814839 B | 12/2020 |

*Primary Examiner* — Aurel Prifti
(74) *Attorney, Agent, or Firm* — Muncy, Geissler, Olds & Lowe, P.C.

(57) ABSTRACT

A power management method for an electronic device is provided. The electronic device includes a processing unit with a core and configured to execute an application program and a functional element. The power management method includes the following steps: determining a maximum frame count per second of a scene; down-tuning a frequency setting value of the core; detecting an actual frame count per second of the scene; determining a change in power consumption of the processing unit and a temperature of the functional element when the actual frame count per second is equal to the maximum frame count per second; and down-tuning the frequency setting value when the power consumption does not increase and the temperature is lower than a preset temperature value, and restoring the frequency setting value when the power consumption increases or the temperature is higher than or equal to the preset temperature value.

8 Claims, 6 Drawing Sheets

(56) References Cited

U.S. PATENT DOCUMENTS

| | | | |
|---|---|---|---|
| 2016/0013643 A1* | 1/2016 | Park | G06F 1/28 |
| | | | 713/300 |
| 2017/0262955 A1* | 9/2017 | Lin | G06F 1/3206 |
| 2018/0095522 A1* | 4/2018 | Huang | G06F 11/3055 |
| 2018/0210530 A1* | 7/2018 | Kwon | G06F 1/3206 |
| 2018/0261143 A1* | 9/2018 | Peng | G06F 1/3243 |
| 2018/0261190 A1* | 9/2018 | Yi | G06F 9/451 |
| 2018/0261191 A1* | 9/2018 | Yi | G09G 5/393 |
| 2020/0105228 A1* | 4/2020 | Chen | G09G 5/001 |
| 2020/0410747 A1* | 12/2020 | Chan | G06F 15/7814 |
| 2021/0089113 A1* | 3/2021 | Hum | G06F 12/0875 |
| 2021/0225320 A1* | 7/2021 | Sin | G09G 5/003 |
| 2021/0255680 A1* | 8/2021 | Li | G06F 1/3206 |
| 2021/0359514 A1* | 11/2021 | Suzuki | H02J 3/003 |
| 2022/0139295 A1* | 5/2022 | Cui | G09G 5/003 |
| | | | 345/204 |
| 2022/0179706 A1* | 6/2022 | Khosrowpour | G06F 11/3466 |
| 2023/0393643 A1* | 12/2023 | Liu | G06F 1/3265 |

* cited by examiner

ELECTRONIC DEVICE AND POWER MANAGEMENT METHOD THEREFOR

CROSS-REFERENCE TO RELATED APPLICATION

This application claims the priority benefit of Taiwan Application Serial No. 110133561, filed on Sep. 9, 2021. The entirety of the above-mentioned patent application is hereby incorporated by reference herein and made a part of specification.

BACKGROUND OF THE INVENTION

Field of the Invention

The disclosure relates to an electronic device, and specifically, to an electronic device having a power management method.

Description of the Related Art

To provide a better operating experience for users, when conventional electronic devices leave the factory, some common application programs are taken into consideration, and the performance and power consumption of the application programs during operation are preset. However, the application programs do not cover all possibly used application programs. If a new application program is launched or an updated version of an existing application program is available, it is impossible to adjust the settings of the application programs on the electric devices timely, which affects a user operating experience.

BRIEF SUMMARY OF THE INVENTION

The disclosure provides an electronic device. The electronic device includes a processing unit, a functional element, a determining unit, and a control unit. The processing unit includes a core and is configured to execute an application program. The functional element operates with the application program. The determining unit is configured to determine a maximum frame count per second of a scene corresponding to the application program. The control unit is configured to monitor power consumption of the processing unit and a temperature of the functional element, and tune a frequency setting value of the core according to a power management method.

The power management method includes the following steps: down-tuning a frequency setting value of the core; detecting an actual frame count per second of the scene; determining a change in the power consumption of the processing unit and the temperature of the functional element when the actual frame count per second is equal to the maximum frame count per second; and down-tuning the frequency setting value when the power consumption does not increase and the temperature is lower than a preset temperature value, and restoring the frequency setting value when the power consumption increases or the temperature is higher than or equal to the preset temperature value.

The disclosure provides a power management method for an electronic device. The electronic device includes a processing unit and a functional element. The processing unit includes a core and is configured to execute an application program. The functional element operates with the application program. The power management method includes the following steps: determining a maximum frame count per second of a scene corresponding to the application program; down-tuning a frequency setting value of the core; detecting an actual frame count per second of the scene; determining a change in power consumption of the processing unit and a temperature of the functional element when the actual frame count per second is equal to the maximum frame count per second; and down-tuning the frequency setting value when the power consumption does not increase and the temperature is lower than a preset temperature value, and restoring the frequency setting value when the power consumption increases or the temperature is higher than or equal to the preset temperature value.

The disclosure provides a power management method for an electronic device. The electronic device includes a processing unit and a functional element. The processing unit includes a plurality of cores and is configured to execute an application program. The functional element operates with the application program. The power management method includes the following steps: determining a maximum frame count per second of a scene corresponding to the application program; selecting one of the cores; down-tuning a frequency setting value of the selected core; detecting an actual frame count per second of the scene; determining a change in power consumption of the processing unit and a temperature of the functional element when the actual frame count per second is equal to the maximum frame count per second; and down-tuning the frequency setting value of the selected core when the power consumption does not increase and the temperature is lower than a preset temperature value, and restoring the frequency setting value and selecting another core from the cores when the power consumption increases or the temperature is higher than or equal to the preset temperature value.

Through the electronic device and the power management method therefor provided in the disclosure, the frequency setting value of the core of the processing unit is dynamically tuned according to the operating status of the application program in the system, to prevent the functional element from having an excessively high temperature and affecting normal operation of the system while taking requirements for both operating efficiency and energy saving into consideration.

DETAILED DESCRIPTION OF THE EMBODIMENTS

More detailed descriptions of specific embodiments of the disclosure are provided below with reference to the schematic diagrams. The advantages and features of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
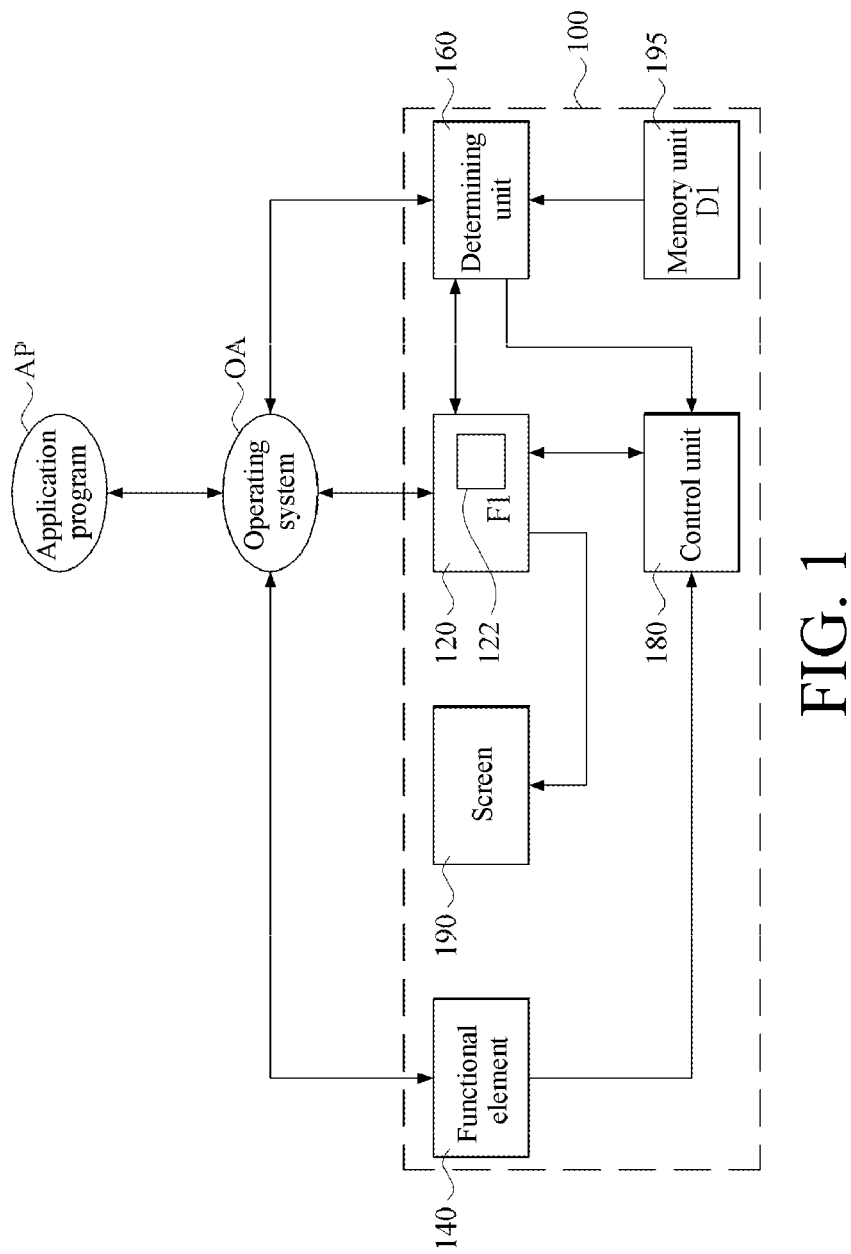
FIG. 1 is a schematic block diagram of a first embodiment of an electronic device according to the disclosure.

FIG. 1 is a schematic block diagram of a first embodiment of an electronic device 100 according to the disclosure. The electronic device 100 is a desktop computer, a notebook computer, or a smart phone, but the disclosure is not limited thereto.

As shown in the figure, the electronic device 100 includes a processing unit 120, a functional element 140, a determining unit 160, and a control unit 180.

The processing unit 120 includes a core 122, configured to execute an application program AP through an operating system OA. In an embodiment, the processing unit 120 is a central processing unit (CPU) or a graphics processing unit (GPU), but the disclosure is not limited thereto.

The functional element 140 is a hardware element operating with the application program AP. In an embodiment, the functional element 140 is a camera module, a power module, or a wireless communication module, but the disclosure is not limited thereto.

The processing unit 120 executes the application program AP through the operating system OA, a screen 190 correspondingly displays a screen. In an embodiment, the screen 190 is part of the electronic device 100 and is alternatively externally connected to the electronic device 100.

In an embodiment, during execution of a game program, the screen 190 displays a scene including game screens; during the execution of a playback program, the screen 190 displays a scene including image windows. In addition, the determining unit 160 is configured to determine a maximum frame count per second of a scene corresponding to the application program AP.

In an embodiment, as shown in the figure, the electronic device 100 further includes a memory unit 195 configured to store frame count data D1 of a plurality of preset application programs. The determining unit 160 compares an application program being executed by the processing unit 120 with the preset application programs, to determine a maximum frame count per second corresponding to the executed application program.

The control unit 180 monitors power consumption of the processing unit 120 and a temperature of the functional element 140, and tunes a frequency setting value F1 of the core 122 according to a power management method, to prevent the functional element 140 from having an excessively high temperature and affecting normal operation of the system while taking requirements for both operating efficiency and energy saving into consideration.

The power management method includes the following steps: a. down-tuning a frequency setting value F1 of the core 122; b. detecting an actual frame count per second of the scene; determining a change in the power consumption of the processing unit 120 and the temperature of the functional element 140 when the actual frame count per second is equal to the maximum frame count per second; and repeating step a to continue to down-tune the frequency setting value F1 of the core 122 when the power consumption of the processing unit 120 does not increase and the temperature of the functional element 140 is lower than a preset temperature value, and restoring the frequency setting value F1 to the value before the down-tuning when the power consumption of the processing unit 120 increases or the temperature of the functional element 140 is higher than or equal to the preset temperature value. The power management method will be explained in more detail in subsequent paragraphs.

Figure 2:
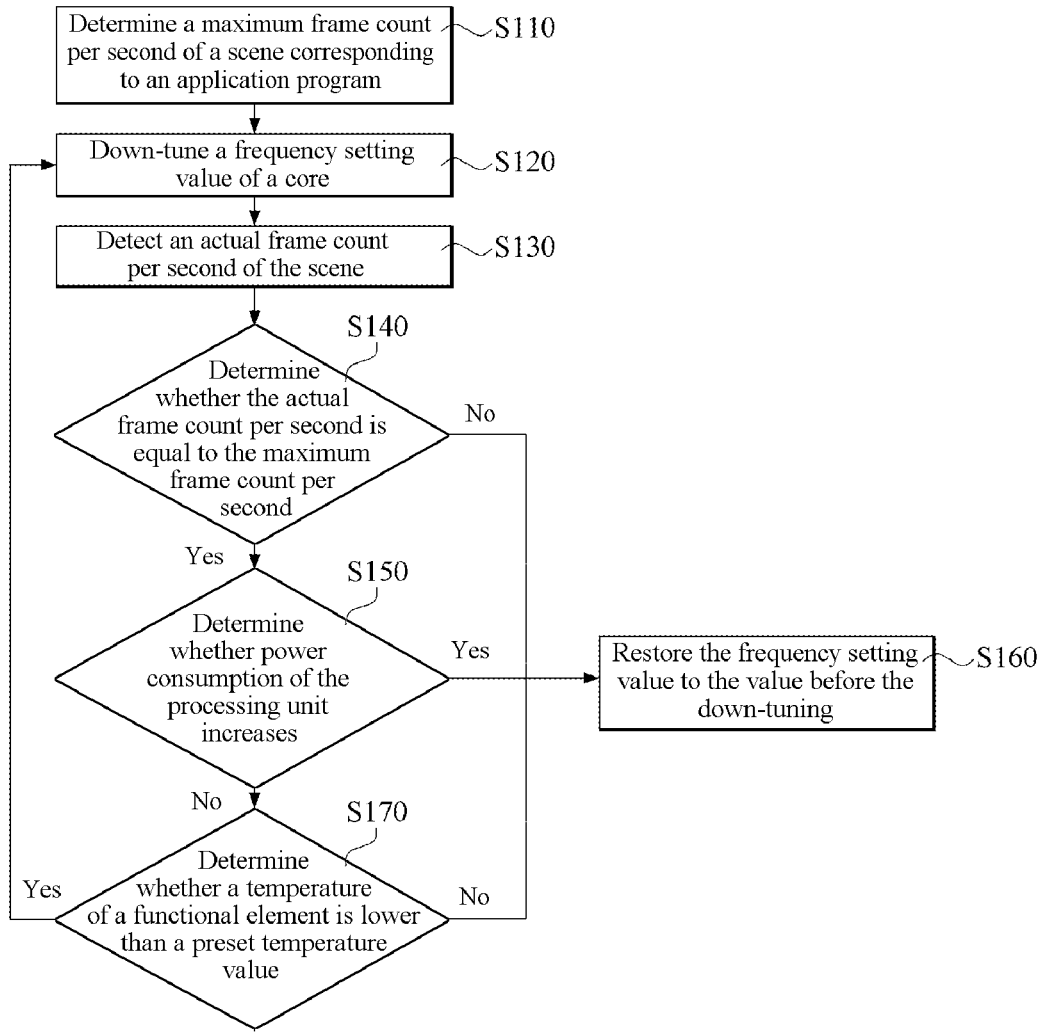
FIG. 2 is a flowchart of a first embodiment of a power management method according to the disclosure.

FIG. 2 is a flowchart of a first embodiment of a power management method according to the disclosure. The power management method is applicable to the electronic device 100 shown in FIG. 1, and includes the following steps.

First, as described in step S110, determine a maximum frame count per second of a scene corresponding to an application program AP.

Then, as described in step S120, down-tune a frequency setting value F1 of a core 122. In an embodiment, step S120 is down-tuning or up-tuning the frequency setting value F1 stepwise according to a preset difference. In an embodiment, step S120 is down-tuning or up-tuning the frequency setting value F1 stepwise by using a fixed frequency adjustment value ΔF.

Then, as described in step S130, detect an actual frame count per second of the scene.

Next, a determining step S140 is performed, to determine whether the actual frame count per second in step S130 is equal to the maximum frame count per second determined in step S110.

When the actual frame count per second is equal to the maximum frame count per second, this process proceeds to a determining step S150, to determine whether power consumption of the processing unit 120 increases. Otherwise, when the actual frame count per second is less than the maximum frame count per second, this process proceeds to step S160, to restore the frequency setting value F1 to the value before the down-tuning, and end the power management method performed by the core 122.

When a determination result of the determining of step S150 indicates that the power consumption of the processing unit 120 does not increase, this process proceeds to step S170, to further determine whether a temperature of the functional element 140 is lower than a preset temperature value. Otherwise, when a determination result of step S150 indicates that the power consumption of the processing unit 120 increases, this process proceeds to step S160, to restore the frequency setting value to the value before the down-tuning, and end the power management method performed by the core 122.

When a determination result of step S170 indicates that the temperature is lower than the preset temperature value, indicating that the frequency down-tuning will not affect the normal execution of the application program AP and the normal operation of the functional element 140, in this case, this process returns to step S120, to continue to down-tune the frequency setting value F1 of the core 122. Otherwise, when the temperature of the functional element 140 is higher than or equal to a preset temperature value, this process proceeds to step S160, to restore the frequency setting value F1 to the value before the down-tuning, and end the power management method performed by the core 122.

The foregoing step S110 is performed by the determining unit 160 in FIG. 1, and steps S120 to S170 are performed by the control unit 180 in FIG. 1.

Figure 3:
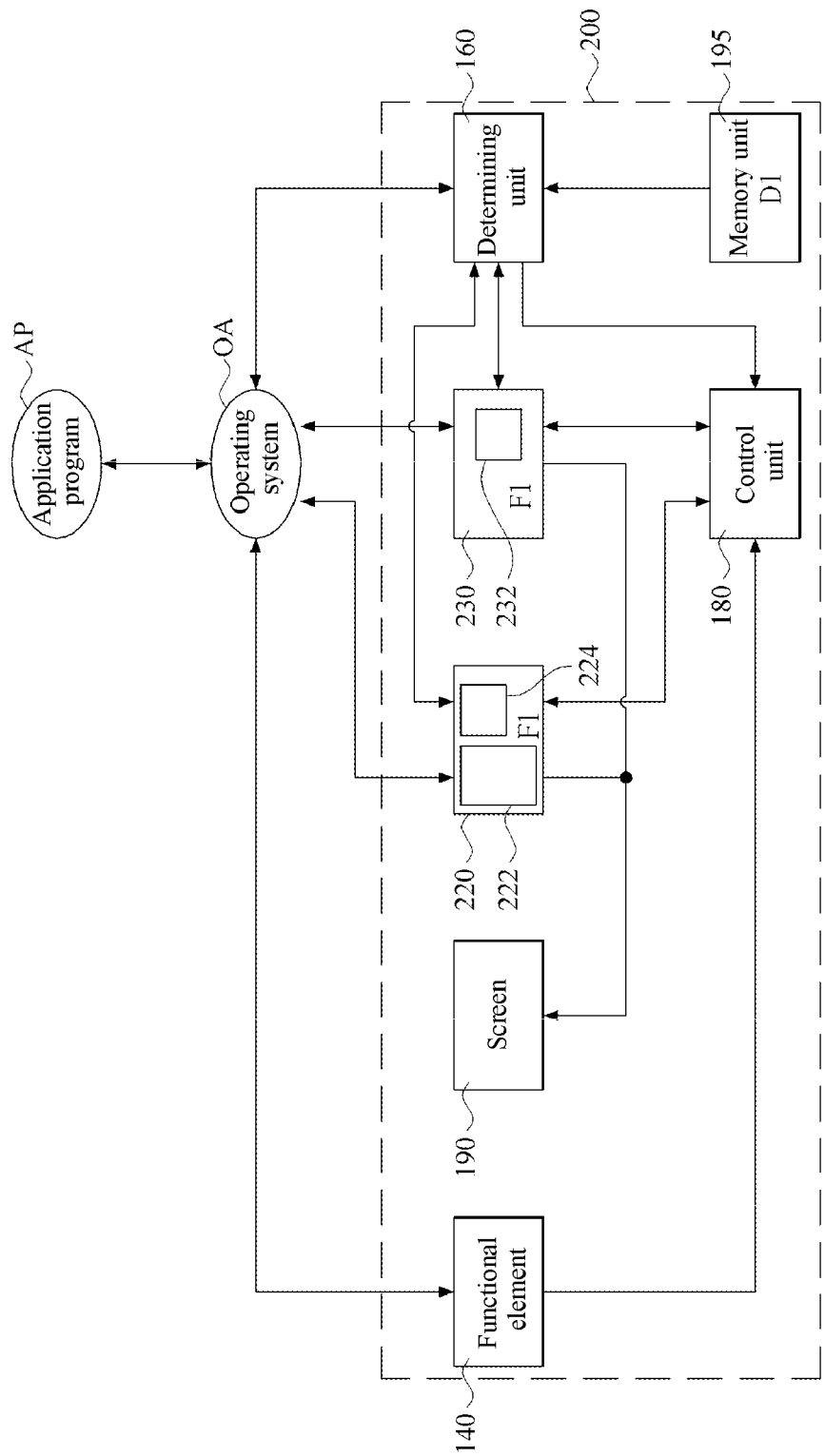
FIG. 3 is a schematic block diagram of a second embodiment of an electronic device according to the disclosure.

FIG. 3 is a schematic block diagram of a second embodiment 200 of an electronic device according to the disclosure. The electronic device 200 of the embodiment includes a first processing unit 220 and a second processing unit 230. The first processing unit 220 includes a plurality of cores 222 and 224. Two cores 222, 224 of different sizes are shown in the figure as an example. Different from the first processing unit 220, the second processing unit 230 includes only a single core 232, but the disclosure is not limited thereto.

In an embodiment, the first processing unit 220 includes more cores. The cores have the same size or different sizes, depending on actual design requirements of a processing unit. In an embodiment, the second processing unit 230 alternatively includes a plurality of cores.

In an embodiment, the first processing unit 220 is a CPU, and the second processing unit 230 is a GPU.

Other elements of the electronic device 200 of this embodiment are similar to those of the embodiment of FIG. 1 and are denoted by the same signs, and details are not described herein again.

Figure 4:
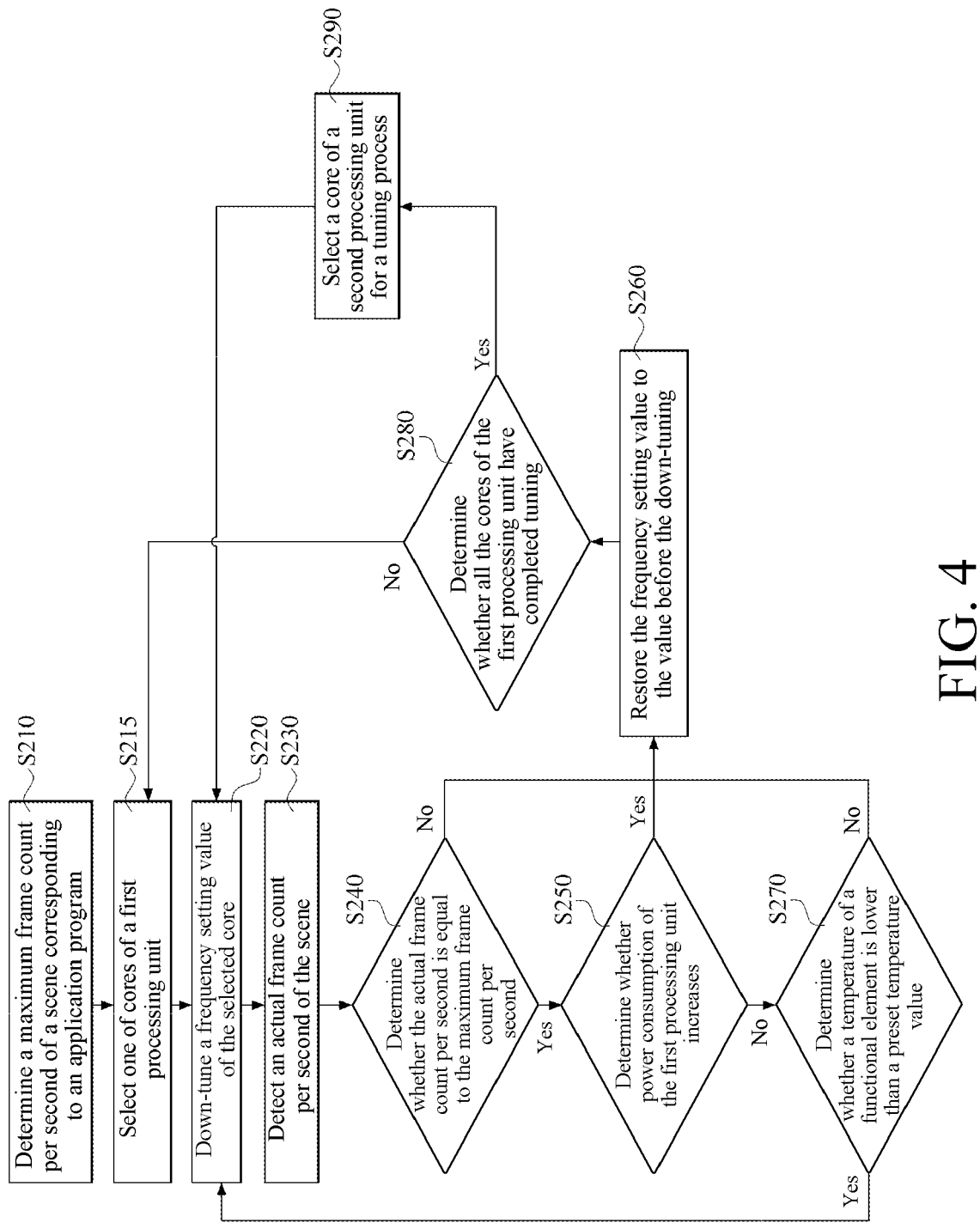
FIG. 4 is a flowchart of a second embodiment of a power management method according to the disclosure.

FIG. 4 is a flowchart of a second embodiment of a power management method according to the disclosure. The power management method is applicable to the electronic device 200 shown in FIG. 3, and includes the following steps.

First, as described in step S210, determine a maximum frame count per second of a scene corresponding to an application program AP.

Then, as described in step S215, select one of cores in a first processing unit 220. In an embodiment, this step is selecting a processing unit with the largest number of cores from processing units that do not complete frequency tuning yet (that is, the first processing unit 220 and a second processing unit 230) to perform frequency tuning, and selecting the largest core from the cores to be tuned. Using the electronic device 200 of FIG. 3 as an example, the core 222 of the first processing unit 220 is selected.

Then, as described in step S220, down-tune a frequency setting value F1 of the selected core. In an embodiment, step S220 is down-tuning or up-tuning the frequency setting value F1 stepwise according to a preset difference. In an embodiment, step S220 is down-tuning or up-tuning the frequency setting value F1 stepwise by using a fixed frequency adjustment value ΔF.

Then, as described in step S230, detect the actual frame count per second of a scene.

Next, a determining step S240 is performed, to determine whether the actual frame count per second in step S230 is equal to the maximum frame count per second determined in step S210.

When the actual frame count per second is equal to the maximum frame count per second, this process proceeds to a determining step S250, to determine whether power consumption of the first processing unit 220 increases. Otherwise, when the actual frame count per second is less than the maximum frame count per second, this process proceeds to step S260, to restore the frequency setting value F1 to the value before the down-tuning, and end the power management method performed by the core 222.

When a determination result of a determining step S250 indicates that the power consumption of the first processing unit 220 does not increase, this process proceeds to a determining step S270, to further determine whether a temperature of the functional element 140 is lower than a preset temperature value. Otherwise, when the power consumption of the first processing unit 220 increases, this process proceeds to step S260, to restore the frequency setting value F1 to the value before the down-tuning, and end the power management method performed by the core 222.

When a determination result of step S270 indicates that the temperature is lower than the preset temperature value, indicating that the frequency down-tuning will not affect the normal execution of the application program AP and the normal operation of the functional element 140, in this case, this process returns to step S220, to continue to down-tune the frequency setting value F1 of the core 222. Otherwise, when the temperature is higher than or equal to a preset temperature value, this process proceeds to step S260, to restore the frequency setting value F1 to the value before the down-tuning, and end the power management method performed by the core 222.

To follow step S260, after ending the power management method performed by the core 222, this process proceeds to a determining step S280, to determine whether all cores of the first processing unit 220 have completed tuning.

When the first processing unit 220 still includes cores that do not perform tuning, this process returns to step S215, to select another core from the cores of the first processing unit 220. For the electronic device of FIG. 3, the core 224 is selected to repeat the foregoing power management method.

Otherwise, when both the cores 222 and 224 of the first processing unit 220 have completed tuning, this process proceeds to step S290 to select a core 232 of the second processing unit 230 for performing the power management method of steps S220 to S270.

The foregoing step S210 is performed by the determining unit 160, and steps S215 to S290 are performed by the control unit 180.

Figure 5:
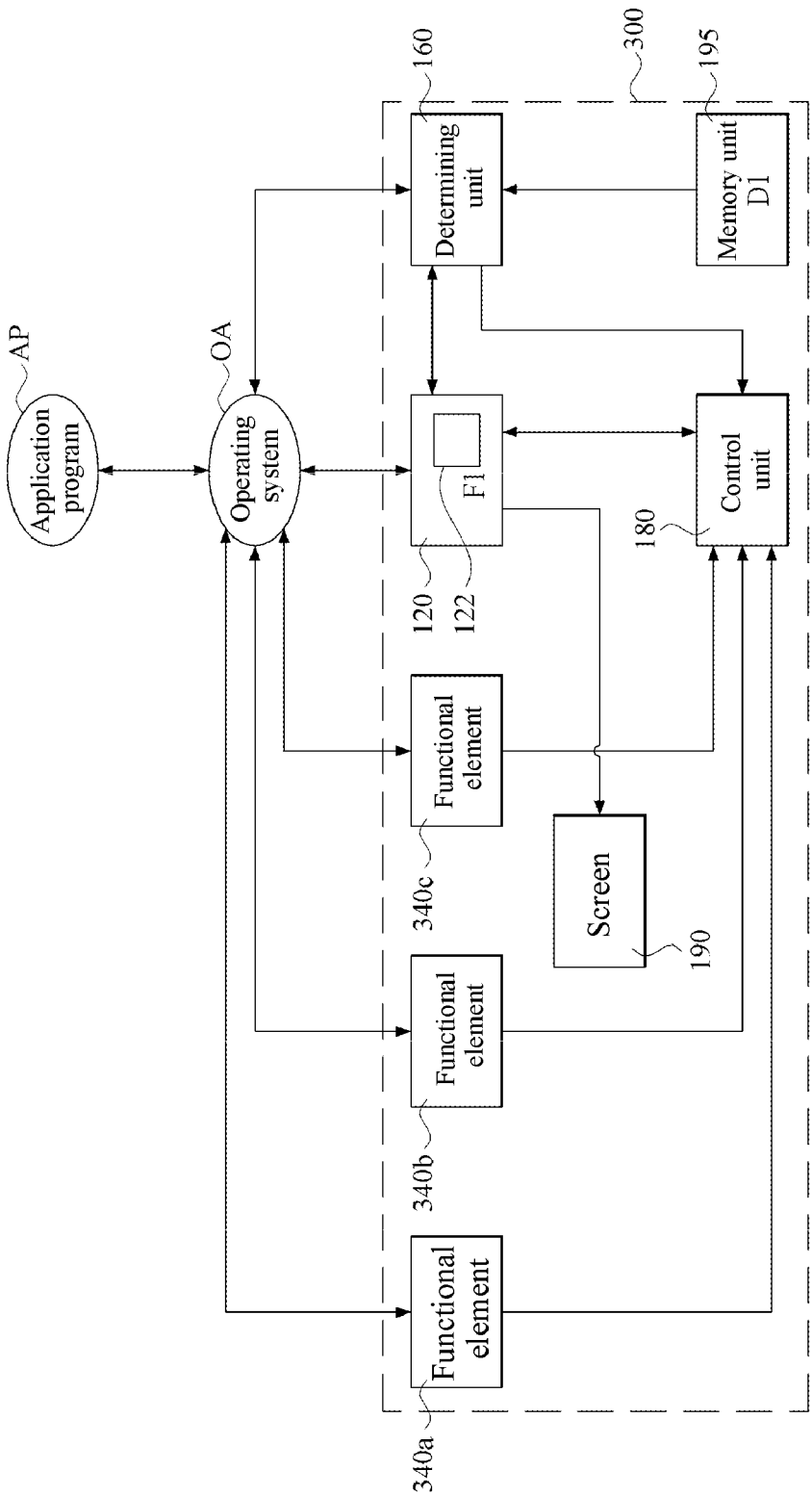
FIG. 5 is a schematic block diagram of a third embodiment of an electronic device according to the disclosure.

FIG. 5 is a schematic block diagram of a third embodiment 300 of an electronic device according to the disclosure. The electronic device 300 is an electronic device including a computer system inside, for example, a desktop computer, a notebook computer, or a smart phone.

Compared with the electronic device in FIG. 1, the electronic device 300 of this embodiment includes a plurality of functional elements 340a, 340b, and 340c. Three functional elements 340a, 340b, and 340c are shown in the figure as an example. These functional elements 340a, 340b, 340c have different functions. Other elements of this embodiment are similar to those of the embodiment of FIG. 1 and are denoted by the same signs, and details are not described herein again.

Figure 6:
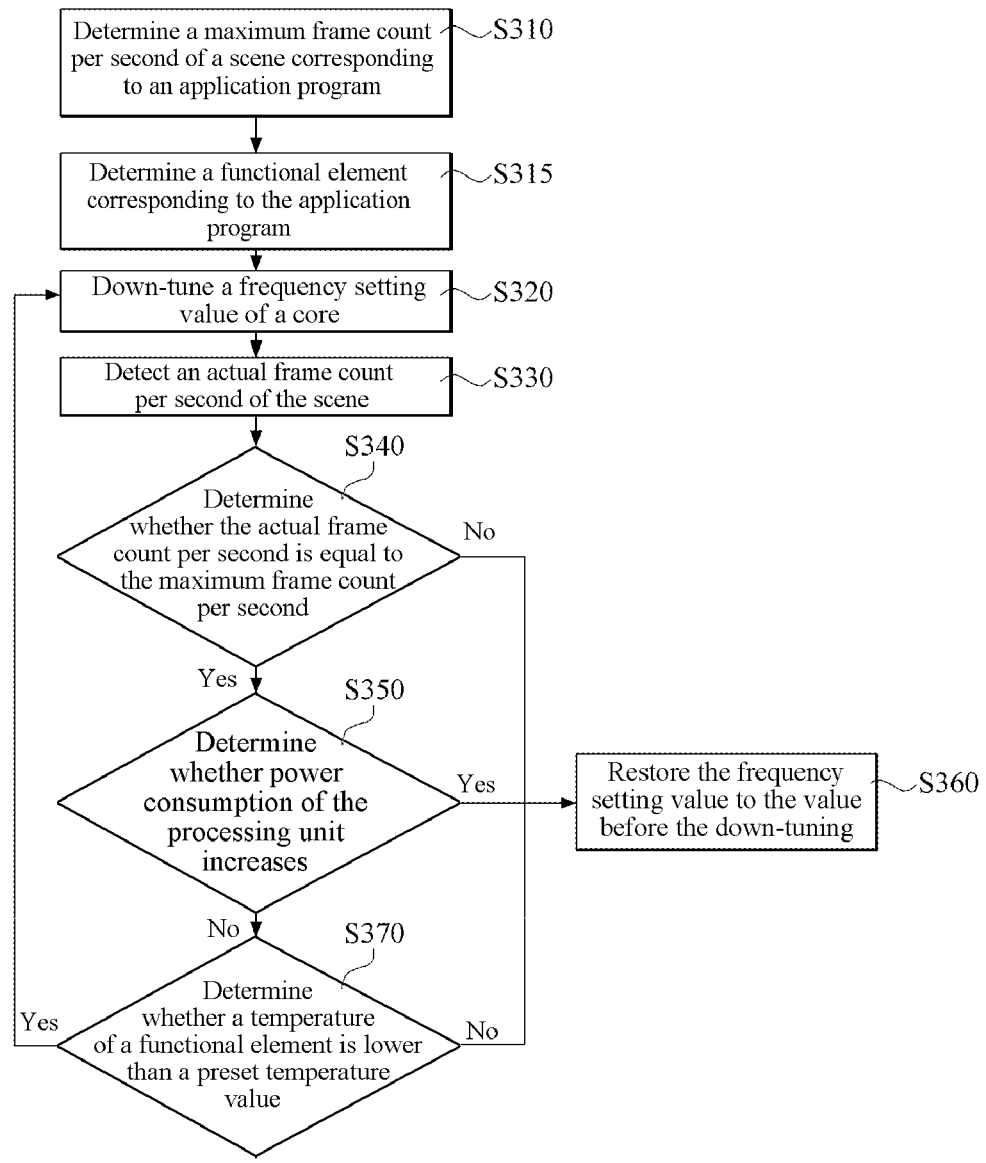
FIG. 6 is a flowchart of a third embodiment of a power management method according to the disclosure.

FIG. 6 is a flowchart of a third embodiment of a power management method according to the disclosure. The power management method is applicable to the electronic device 300 shown in FIG. 5, and includes the following steps.

First, as described in step S310, determine a maximum frame count per second of a scene corresponding to the application program AP.

Next, as described in step S315, determine a functional element corresponding to the application program AP in the functional elements 340a, 340b, 340c. In an embodiment, this step is identifying a functional element operating with the application program AP among the functional elements.

In an embodiment, in this step, the functional elements corresponding to various application programs AP are determined according to a preset correspondence. In an embodiment, when the application program AP is a camera application program, a corresponding functional element is a camera module. When the application program AP is a download program, a corresponding functional element is a wireless communication module. When the application program AP is a 3D game program that needs to use computing capabilities of a large number of processing units, a corresponding functional element is a power module.

Then, as described in step S320, down-tune a frequency setting value F1 of a core 122. In an embodiment, step S320 is down-tuning or up-tuning the frequency setting value F1 stepwise according to a preset difference. In an embodiment, step S320 is down-tuning or up-tuning the frequency setting value F1 stepwise by using a fixed frequency adjustment value ΔF.

Then, as described in step S330, detect an actual frame count per second of the scene.

Next, a determining step S340 is performed, to determine whether the actual frame count per second is equal to the maximum frame count per second.

When the actual frame count per second is equal to the maximum frame count per second, this process proceeds to a determining step S350, to determine whether power consumption of the processing unit 120 increases. Otherwise, when the actual frame count per second is less than the maximum frame count per second, this process proceeds to step S360, to restore the frequency setting value F1 to the value before the down-tuning, and end the power management method performed by the core 122.

When a determination result of the determining step S350 indicates that the power consumption of the processing unit 120 does not increase, this process proceeds to a determining step S370, to further determine whether a temperature of the functional element corresponding to the application program AP is lower than a preset temperature value. Otherwise, when a determination result of determining step S350 indicates that the power consumption increases, this process proceeds to step S360, to restore the frequency setting value F1 to the value before the down-tuning, and end the power management method performed by the core 122.

When a determination result of the determining step S370 indicates that the temperature is lower than the preset temperature value, indicating that the frequency down-tuning will not affect the normal execution of the application program AP and the normal operation of the corresponding functional element, in this case, this process returns to step S320, to continue to down-tune the frequency setting value F1 of the core 122. When the temperature is higher than or equal to the preset temperature value, this process proceeds to step S360, to restore the frequency setting value F1 to the value before the down-tuning, and end the power management method performed by the core 122.

The foregoing step S310 is performed by the determining unit 160 in FIG. 5, and steps S315 to S370 are performed by the control unit 180 in FIG. 5.

Through the electronic device 100, 200 and 300, and the power management method therefor provided in the disclosure, the frequency setting value of the core 122 of the processing unit 120 is dynamically tuned according to the operating status of the application program AP in the computer system, to prevent the functional element 140 from having an excessively high temperature and affecting normal operation of the system while taking requirements for both operating efficiency and energy saving into consideration.

The above are merely preferred embodiments of the disclosure, and do not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. An electronic device, comprising:
 a processing unit, comprising a core and configured to execute an application program, when the application program is executed, the processing unit being configured to function as:
  a determining unit, configured to determine a maximum frame count per second of a scene corresponding to the application program;
 a functional device, operating with the application program;
 a power consumption and temperature monitoring device, configured to monitor power consumption of the processing unit and a temperature of the functional device, and tune a frequency setting value of the core according to a power management method; and
 a memory unit configured to store frame count data of a plurality of preset application programs,
 wherein the determining unit compares the application program with the plurality of preset application programs to determine the maximum frame count per second, and
 wherein the power management method comprises the following steps:
  down-tuning the frequency setting value of the core;
  detecting an actual frame count per second of the scene after the frequency setting value is tuned down;
  determining a change in the power consumption of the processing unit and the temperature of the functional device after the frequency setting value is tuned down and when the actual frame count per second is equal to the maximum frame count per second; and
  down-tuning the frequency setting value when the power consumption does not increase and the temperature is lower than a preset temperature value, and restoring the frequency setting value when the power consumption increases or the temperature is higher than or equal to the preset temperature value.

2. The electronic device according to claim 1, wherein the processing unit is a central processing unit (CPU).

3. The electronic device according to claim 1, wherein the processing unit is a graphics processing unit (GPU).

4. The electronic device according to claim 1, wherein the functional device is a camera module, a power module, or a wireless communication module.

5. The electronic device according to claim 1, wherein the power consumption and temperature monitoring device down-tunes or up-tunes the frequency setting value stepwise according to a preset difference.

6. A power management method for an electronic device, the electronic device comprising a processing unit, a memory unit and a functional device, the processing unit comprising a core and configured to execute an application program, the memory unit being configured to store frame count data of a plurality of preset application programs, and the functional device operating with the application program, the power management method comprising the following steps:
 comparing the application program with the preset application programs;
 determining a maximum frame count per second of a scene corresponding to the application program;
 down-tuning a frequency setting value of the core;
 detecting an actual frame count per second of the scene after the frequency setting value is tuned down;
 determining a change in power consumption of the processing unit and a temperature of the functional device after the frequency setting value is tuned down and when the actual frame count per second is equal to the maximum frame count per second; and
 down-tuning the frequency setting value when the power consumption does not increase and the temperature is lower than a preset temperature value, and restoring the frequency setting value when the power consumption increases or the temperature is higher than or equal to the preset temperature value.

7. A power management method for an electronic device, the electronic device comprising a processing unit, a memory unit and a functional device, the processing unit comprising a plurality of cores and configured to execute an application program, the memory unit being configured to store frame count data of a plurality of preset application programs, and the functional device operating with the application program, the power management method comprising the following steps:

comparing the application program with the preset application programs;

determining a maximum frame count per second of a scene corresponding to the application program;

selecting one of the cores;

down-tuning a frequency setting value of the selected core;

detecting an actual frame count per second of the scene after the frequency setting value is tuned down;

determining a change in power consumption of the processing unit and a temperature of the functional device after the frequency setting value is tuned down and when the actual frame count per second is equal to the maximum frame count per second; and down-tuning the frequency setting value of the selected core when the power consumption does not increase and the temperature is lower than a preset temperature value, and restoring the frequency setting value and selecting another core from the cores when the power consumption increases or the temperature is higher than or equal to the preset temperature value.

8. The power management method according to claim 7, wherein the step of selecting another core from the cores is selecting a largest core from the cores that do not perform frequency tuning yet.

* * * * *